(12) United States Patent
Zhao et al.

(10) Patent No.: US 11,897,972 B2
(45) Date of Patent: Feb. 13, 2024

(54) HYDROGEN BOND INDUCED HIGH STABILITY POROUS COVALENT ORGANIC GEL MATERIAL AND PREPARATION METHOD THEREOF

(71) Applicant: SHENZHEN GREEN FIELDS ENVIRONMENTAL TECH. CO., LTD, Shenzhen (CN)

(72) Inventors: Jianwei Zhao, Shenzhen (CN); Zengliang Fan, Shenzhen (CN); Ying Xu, Shenzhen (CN); Liang Shao, Shenzhen (CN); Jiaming Guo, Shenzhen (CN)

(73) Assignee: SHENZHEN GREEN FIELDS ENVIRONMENTAL TECH. CO., LTD, Shenzhen (CN)

( * ) Notice: Subject to any disclaimer, the term of this patent is extended or adjusted under 35 U.S.C. 154(b) by 283 days.

(21) Appl. No.: 17/317,217

(22) Filed: May 11, 2021

(65) Prior Publication Data
US 2022/0251257 A1 Aug. 11, 2022

(30) Foreign Application Priority Data
Feb. 9, 2021 (CN) .......................... 202110181628.6

(51) Int. Cl.
*C08F 132/04* (2006.01)
(52) U.S. Cl.
CPC ................. *C08F 132/04* (2013.01)

(58) Field of Classification Search
CPC ..................................................... C08F 132/04
See application file for complete search history.

(56) References Cited

FOREIGN PATENT DOCUMENTS

CN 109320757 A * 2/2019

OTHER PUBLICATIONS

Machine translation of CN-109320757-A. (Year: 2019).*

* cited by examiner

*Primary Examiner* — Catherine S Branch
(74) *Attorney, Agent, or Firm* — Zhigang Ma

(57) ABSTRACT

A hydrogen bond induced high stability porous covalent organic gel material and a preparation method thereof are provided. The method comprises: dissolving tetrakis(4-carboxyphenyl)silane in methanol to obtain solution A; adding concentrated sulfuric acid to the solution A, then water-bath heating and re-flowing to obtain a solution B; evaporating the solution B, dissolving remaining powder with an ethyl acetate, washing and drying, filtering and then evaporating the filtrate until crystallization to obtain a colorless solid C; dissolving the colorless solid C and hydrazine hydrate in methanol, water-bath re-fluxing, filtering and collecting white powder, washing and drying to obtain a white solid D; adding the white solid D and 1,4-Phthalaldehyde to N,N-dimethyl-formamide, adding trifluoroacetic acid, and then getting the desired material. The material is has high synthesis efficiency, abundant functional groups, a large specific surface area, a good adsorption performance, and excellent chemical stability and thermal stability.

10 Claims, 4 Drawing Sheets

HYDROGEN BOND INDUCED HIGH STABILITY POROUS COVALENT ORGANIC GEL MATERIAL AND PREPARATION METHOD THEREOF

TECHNICAL FIELD

The present invention relates to a cross field of preparation of nano materials and environmental materials and, in particular to a hydrogen bond induced high stability porous covalent organic gel material and a preparation method thereof.

BACKGROUND

The skeleton of covalent organic polymers (COPs) is composed of light elements (e.g., B, C, N, O, Si). The structure and function of the skeleton can be predetermined and designed. COPs have a high specific surface area, a good adsorption, strong thermal stability and chemical stability. As porous materials, Covalent Organic Gel (hereinafter referred to as COG) is a multi-layered porous covalent organic unity with excellent physical properties, high specific surface area, adjustable porosity, inherent structure retention and low density. It has broad application prospects in sorbent, sensors, mass transfer and other fields.

An existing patent 201811029172.6 discloses a preparation method of hydrogen bonded covalent organic polymer material JLUE-HCOP. The JLUE-HCOP has an amorphous structure, an excellent thermal stability and a large specific surface area. However, due to gradual expansion of application of covalent organic gels, this kind of traditional materials is difficult to meet the demands for current materials. At the same time, new materials and their preparation methods suitable for different fields and scenes need to be developed.

SUMMARY OF THE PRESENT INVENTION

Therefore, a hydrogen bond induced high stability porous covalent organic gel material with rich functional groups, large specific surface area, an excellent adsorption capacity, excellent chemical stability and thermal stability, and its preparation method are provided.

A preparation method of hydrogen bond induced high stability porous covalent organic gel material comprises the following steps:

Step (a), tetrakis(4-carboxyphenyl)silane is dissolved in methanol, and a concentration of tetra(4-carboxyphenyl)silane is kept at 10 g/L, which was named as solution A;

Step (b), adding concentrated sulfuric acid to the solution A in a volume of 2 mL per liter of the solution A, then water-bath heating and re-flowing for a predetermined time to obtain a solution B after cooling;

Step (c), evaporating the solution B under a vacuum pressure, dissolving remaining powder with an ethyl acetate, washing it with deionized water for predetermined times and drying, filtering and then evaporating the filtrate in a rotary evaporator until crystallization to obtain a colorless solid C, the colorless solid C is tetra(4-methylformate phenyl)silane;

Step (d), the colorless solid C and hydrazine hydrate are dissolved in methanol, with a concentration of colorless solid C is 55 g/L and a concentration of hydrazine hydrate is 35 ml/L, water-bath re-fluxing for a predetermined time, filtering and collecting white powder, and washing the white powder with methanol, drying and then obtaining a white solid D, the white solid D is tetra(4-benzoylhydrazide)silane;

Step (e), adding the white solid D and 1,4-Phthalaldehyde to N,N-dimethyl-formamide so that a concentration of the white solid D is 10 g/L and a concentration of 1,4-Phthalaldehyde is 5 g/L, after being dissolved, adding trifluoroacetic acid with an adding volume of 50 mL in per liter of the dissolved solution, and then getting a white opaque gel after 15-20 seconds and thus obtaining the desired hydrogen bond induced high stability porous covalent organic gel material.

Preferably, the water-bath temperature in step (b) is 85° C., and the re-fluxing predetermined time is 48 hours. Preferably, in step (d), the water-bath temperature is 60° C. and the re-fluxing predetermined time is 48 hours. Preferably, in step (c), the drying process is performed with anhydrous magnesium sulfate. Preferably, in step (d), the drying process is performed at 70° C. in a constant temperature drying oven with a blast.

In accordance with another aspect of the present invention, a hydrogen bond induced high stability porous covalent organic gel material is provided, which is synthesized through the preparation method of the hydrogen bond induced high stability porous covalent organic gel material as described above.

In the hydrogen bond induced high stability porous covalent organic gel material (hereinafter referred to as GFA-1) and its preparation method, the COG material is synthesized by using an orthogonal reaction of imine chemical bond and hydrogen bond. The material has the following characteristics: (1) porous covalent organic polymer with multi-function formed by two monomers; (2) COGs are formed through a condensation reaction of aldehydes with hydrazine along with hydrogen bond action, and this forming means greatly enriches the kinds of COPs. The above covalent organic gel material GFA-1 has at least the following advantages: (A) abundant functional groups on its surface; (B) a large specific surface area; (C) good thermal stability; (D) good adsorption performance.

DETAILED DESCRIPTION OF THE PRESENT INVENTION

The foregoing and other exemplary purposes, aspects and advantages of the present invention will be better understood in principle from the following detailed description of one or more exemplary embodiments of the present invention with reference to the embodiment(s) and accompanied drawings. It is understood to one skilled in the art that the following description with reference to the embodiment(s) and accompanied drawings is merely to explain concepts and principals of the present invention but should not be seemed as limitation to the scope of the present invention.

Figure 1:
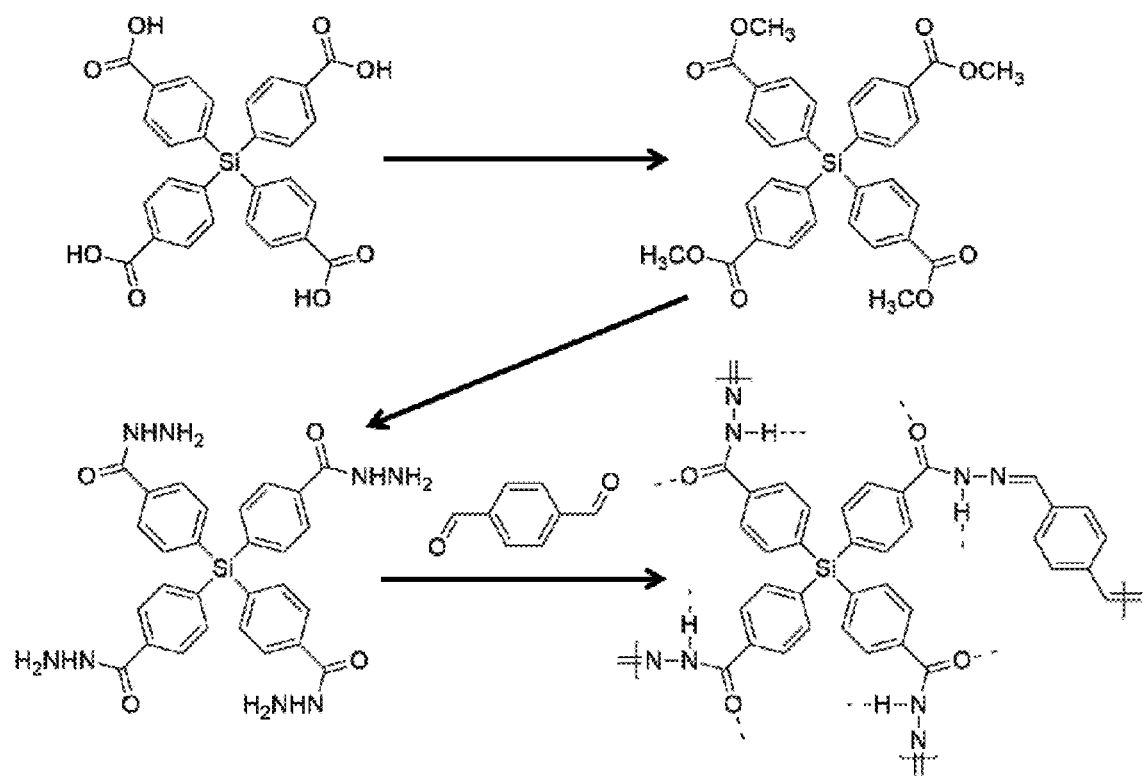
FIG. 1 is a schematic diagram of a synthesis route of GFA-1 prepared according to an embodiment of the present invention.

Please referring to FIG. 1, showing a synthesis route in accordance with an embodiment of the present invention, a preparation method of hydrogen bond induced high stability porous covalent organic gel material comprises the following steps:

Step (a), tetrakis(4-carboxyphenyl)silane is dissolved in methanol, and a concentration of tetra(4-carboxyphenyl)silane is kept at 10 g/L, which was named as solution A;

Step (b), adding concentrated sulfuric acid to the solution A in a volume of 2 mL per liter of the solution A, then water-bath heating and re-flowing for a predetermined time to obtain a solution B after cooling;

Step (c), evaporating the solution B under a vacuum pressure, dissolving remaining powder with an ethyl acetate, washing it with deionized water for predetermined times and drying, filtering and then evaporating the filtrate in a rotary evaporator until crystallization to obtain a colorless solid C, the colorless solid C is tetra(4-methylformate phenyl)silane;

Step (d), the colorless solid C and hydrazine hydrate are dissolved in methanol, with a concentration of colorless solid C is 55 g/L and a concentration of hydrazine hydrate is 35 ml/L, water-bath re-fluxing for a predetermined time, filtering and collecting white powder, and washing the white powder with methanol, drying and then obtaining a white solid D, the white solid D is tetra(4-benzoylhydrazide) silane;

Step (e), adding the white solid D and 1,4-Phthalaldehyde to N,N-dimethyl-formamide so that a concentration of the white solid D is 10 g/L and a concentration of 1,4-Phthalaldehyde is 5 g/L, after being dissolved, adding trifluoroacetic acid with an adding volume of 50 mL in per liter of the dissolved solution, and then getting a white opaque gel after 15-20 seconds and thus obtaining the desired hydrogen bond induced high stability porous covalent organic gel material.

Preferably, the water-bath temperature in step (b) is 85° C., and the re-fluxing predetermined time is 48 hours. Preferably, in step (d), the water-bath temperature is 60° C. and the re-fluxing predetermined time is 48 hours. Preferably, in step (c), the drying process is performed with anhydrous magnesium sulfate. Preferably, in step (d), the drying process is performed at 70° C. in a constant temperature drying oven with a blast.

As shown in FIG. 1, the hydrogen bond induced high stability porous covalent organic gel material is made through the preparation method described above.

Figure 2:
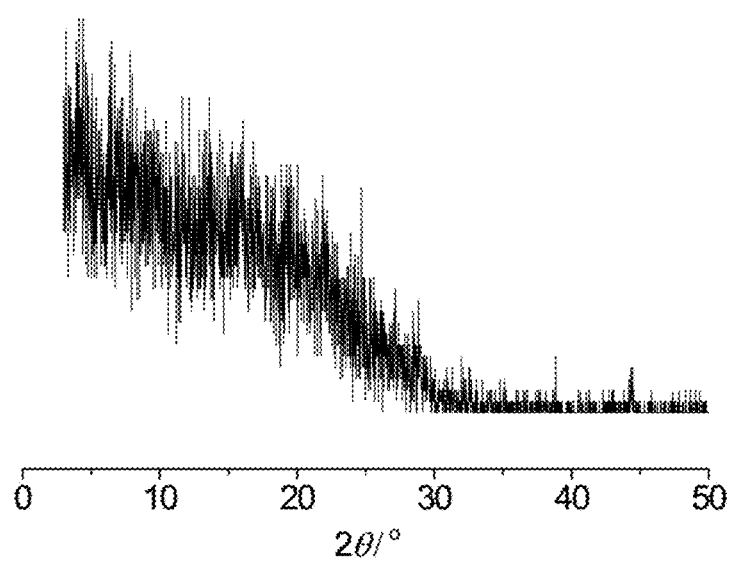
FIG. 2 is an X-ray diffraction spectrum of powdery GFA-1 prepared according to the embodiment of the present invention.

Specifically, an X-ray diffraction spectrum of organic gel materials GFA-1 prepared according to the embodiment of the present invention is shown in FIG. 2.

Figure 3:
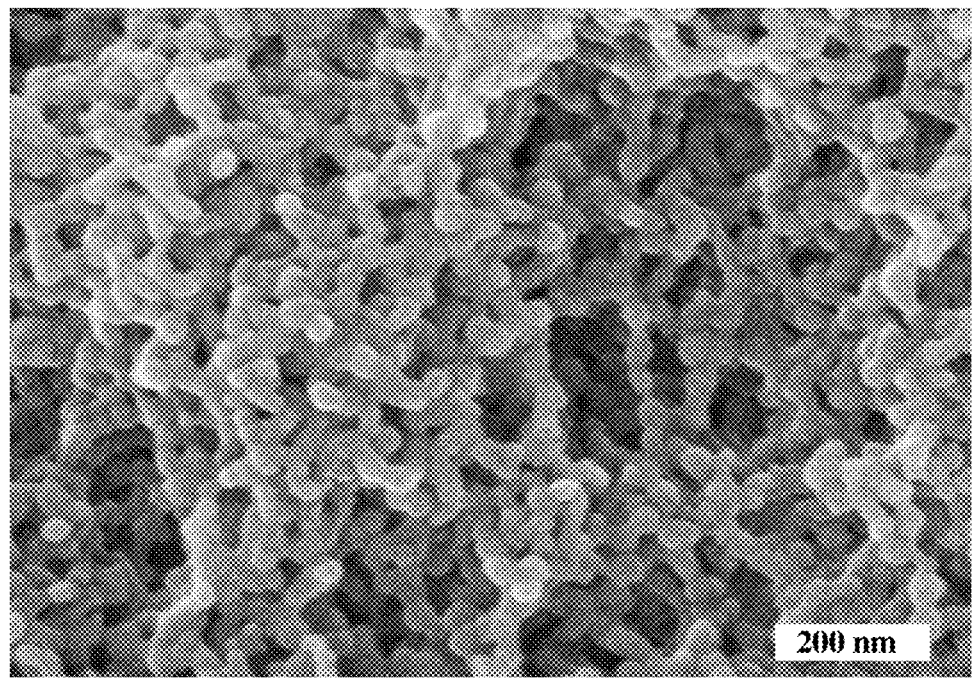
FIG. 3 is a scanning electron microscope (SEM) photograph of the GFA-1 prepared according to the first embodiment of the present invention.

A scanning electron microscope photograph of the GFA-1 prepared according to the first embodiment of the present invention is shown in FIG. 3. It is shown in the figure that the synthesized porous covalent organic gel material GFA-1 has a uniform and ordered particle size and a variety of pore sizes.

Figure 4:
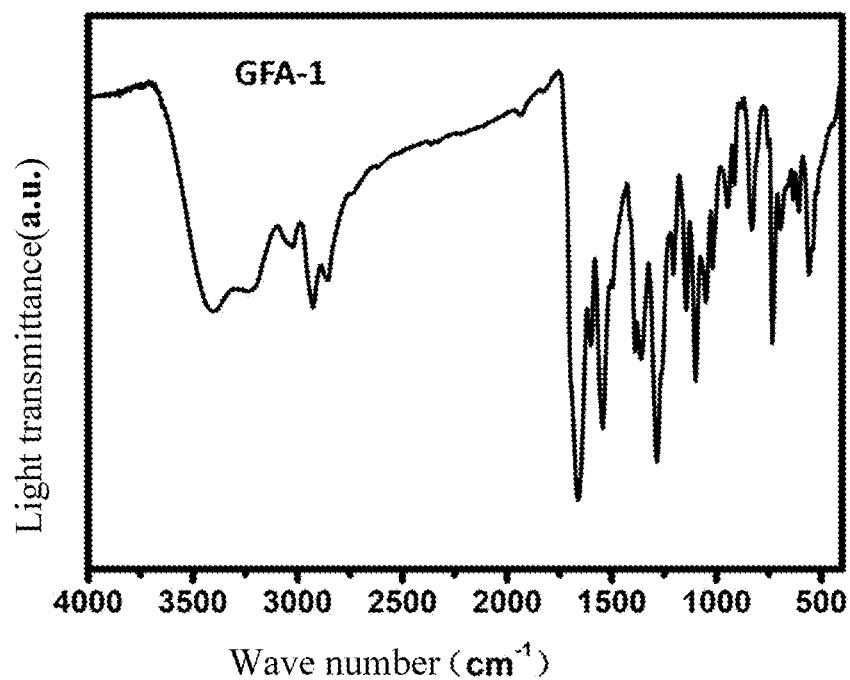
FIG. 4 is a Fourier transform infrared spectrum of the GFA-1 prepared according to the embodiment of the present invention.

A Fourier transform infrared spectrum of the GFA-1 prepared according to the embodiment of the present invention is shown in FIG. 4. It is shown in the figure that there exists a variety of functional groups in the synthesized porous covalent organic gel material GFA-1.

Figure 5:
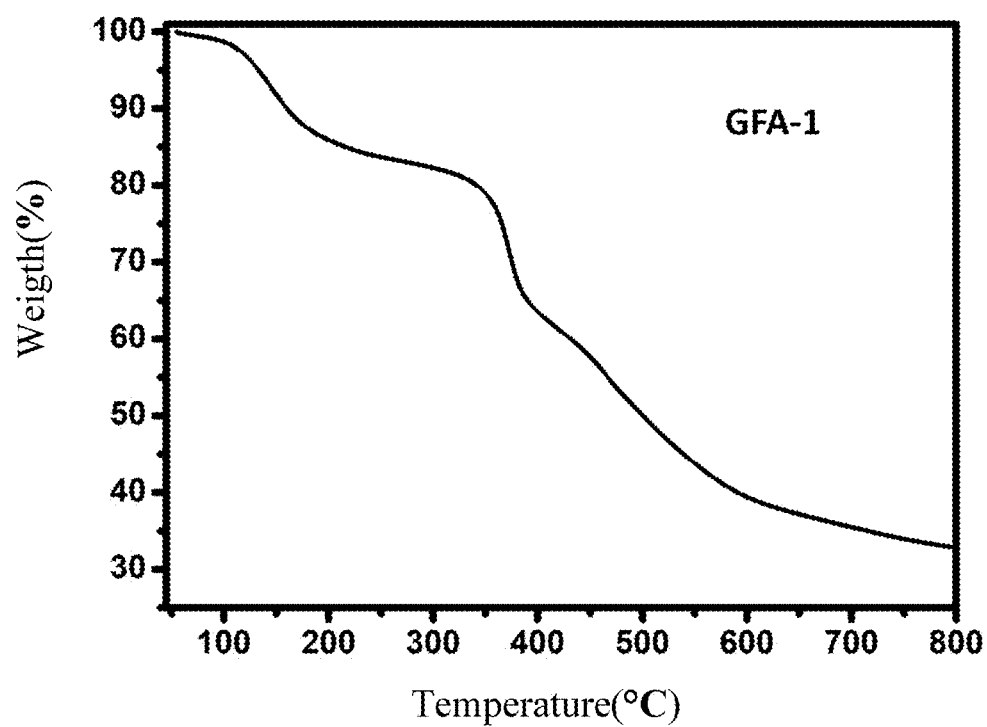
FIG. 5 is a thermogravimetric curve of a the GFA-1 prepared according to the embodiment of the present invention.

A thermogravimetric curve of a the GFA-1 prepared according to the embodiment of the present invention is shown in FIG. 5. It is shown in the figure that the synthesized porous covalent organic gel material GFA-1 has a good thermal stability.

Figure 6:
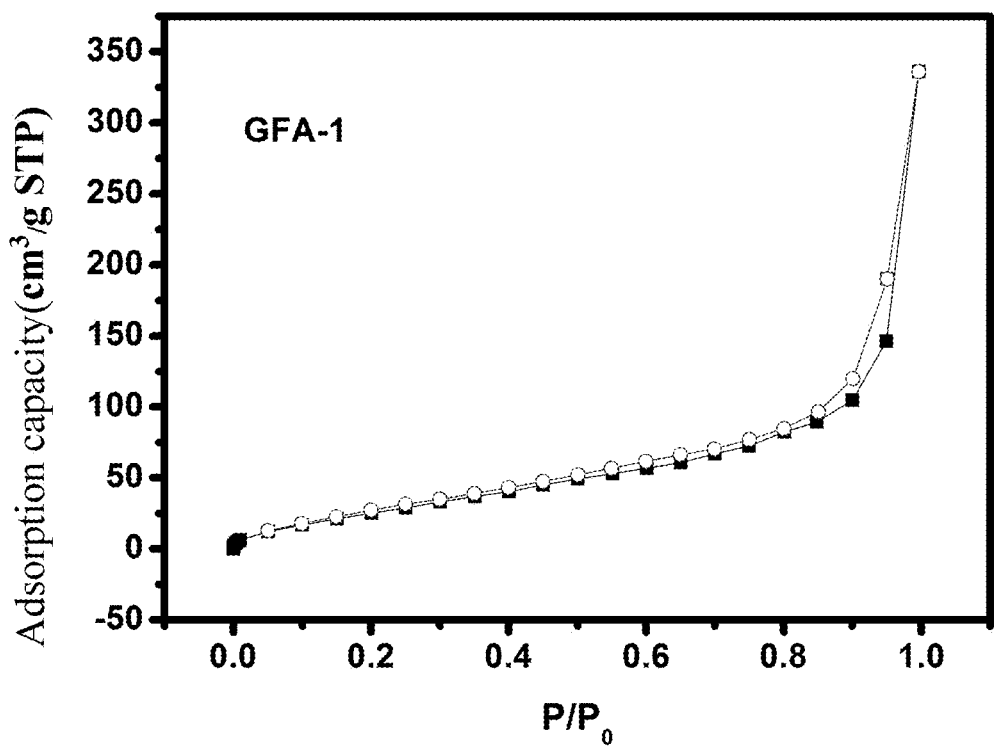
FIG. 6 is a nitrogen adsorption desorption curve of the GFA-1 prepared according to the embodiment of the present invention.

A nitrogen adsorption desorption curve of the GFA-1 prepared according to the embodiment of the present invention is shown in FIG. 6. It is shown in the figure that the synthesized porous covalent organic gel material GFA-1 has a large specific surface area and thus has good adsorption properties.

Figure 7:
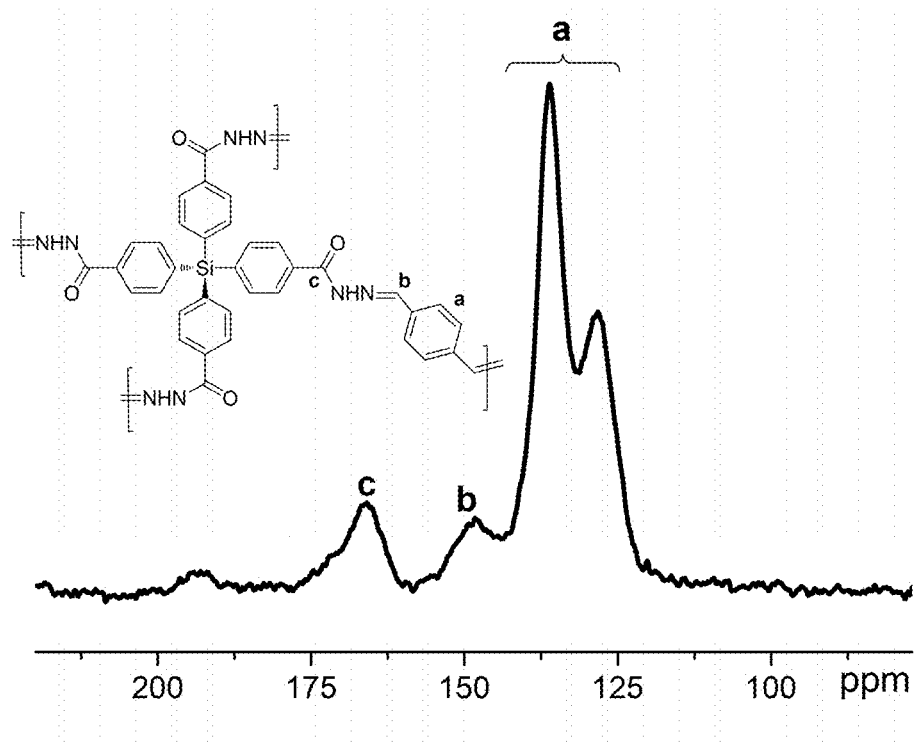
FIG. 7 is a solid carbon 13-CP/MAS nuclear magnetic resonance (NMR) spectrum of the GFA-1 prepared according to the first embodiment of the present invention.

A solid carbon 13-CP/MAS nuclear magnetic resonance (NMR) spectrum of the GFA-1 prepared according to the first embodiment of the present invention is shown in FIG. 7. It is shown in the figure that the synthesized porous covalent organic gel material GFA-1 has carbon carbon bonds, carbon nitrogen bonds and carbon oxygen double bonds at three positions of a, b and c.

The preparation method of hydrogen bond induced high stability porous covalent organic gel material GFA-1 will be from the following detailed examples.

Example 1

The preparation method of hydrogen bond induced high stability porous covalent organic gel material GFA-1 in this example comprises the following steps:

Step (i): 1 gram tetrakis(4-carboxyphenyl)silane is dissolved in 100 mL methanol in a 250 mL capacity round bottom flask to obtain a solution A;

Step (ii), adding 0.2 mL concentrated sulfuric acid to the obtained solution A in step (i), then water-bath heating and re-flowing for 48 hours at a temperature of 85° C. to obtain a solution B after cooling;

Step (iii), evaporating the solution B under a vacuum pressure, dissolving remaining powder with an ethyl acetate, washing it with deionized water for three times and drying with anhydrous magnesium sulfate, filtering and then evaporating the filtrate liquor in a rotary evaporator until crystallization to obtain a colorless solid C, the colorless solid C is tetra(4-methylformate phenyl)silane;

Step (iv), 1.1 g colorless solid C and 0.7 mL hydrazine hydrate are dissolved in methanol in a 50 mL capacity round bottom flask, water-bath re-fluxing for 48 hours at a temperature of 60° C., filtering and collecting white powder, and washing the white powder with a small amount of methanol, drying the washed white powder at 70° C. in a constant temperature drying oven with a blast, and then obtaining a white solid D, the white solid D is tetra(4-benzoylhydrazide) silane;

Step (v), adding 100 mg white solid D and 50 mg 1,4-Phthalaldehyde to N,N-dimethyl-formamide, after being dissolved, adding 0.5 mL trifluoroacetic acid, and then getting a white opaque gel after 15 seconds and thus obtaining the desired hydrogen bond induced high stability porous covalent organic gel material GFA-1.

Example 2

The preparation method of hydrogen bond induced high stability porous covalent organic gel material GFA-1 in this example comprises the following steps:

Step (i): 2 g tetrakis(4-carboxyphenyl)silane is dissolved in 200 mL methanol in a 500 mL capacity round bottom flask to obtain a solution A;

Step (ii), adding 0.4 mL concentrated sulfuric acid to the obtained solution A in step (i), then water-bath heating and re-flowing for 48 hours at a temperature of 85° C. to obtain a solution B after cooling;

Step (iii), evaporating the solution B under a vacuum pressure, dissolving remaining powder with an ethyl acetate, washing it with deionized water for three times and drying with anhydrous magnesium sulfate, filtering and then evaporating the filtrate liquor in a rotary evaporator until crystallization to obtain a colorless solid C, the colorless solid C is tetra(4-methylformate phenyl)silane;

Step (iv), 2.2 g colorless solid C and 1.4 mL hydrazine hydrate are dissolved in 40 mL methanol in a 100 mL capacity round bottom flask, water-bath re-fluxing for 48 hours at a temperature of 60° C., filtering and collecting white powder, and washing the white powder with a small amount of methanol, drying the washed white powder at 70° C. in a constant temperature drying oven with a blast, and then obtaining a white solid D, the white solid D is tetra(4-benzoylhydrazide)silane;

Step (v), adding 200 mg white solid D and 100 mg 1,4-Phthalaldehyde to N,N-dimethyl-formamide, after being dissolved, adding 1.0 mL trifluoroacetic acid, and then getting a white opaque gel after 20 seconds and thus obtaining the desired hydrogen bond induced high stability porous covalent organic gel material GFA-1.

The above are described as embodiments of the present invention, however, it is no way intended to limit the present invention to these embodiments. Any changes, equivalences and modifications within the spirit and scope of the present invention should be encompassed within the scope appended claims.

What is claimed is:

1. A preparation method of hydrogen bond induced high stability porous covalent organic gel material, comprising the following steps:
    step 1, tetrakis (4-carboxyphenyl) silane is dissolved in methanol, and a concentration of tetra(4-carboxyphenyl)silane is kept at 10 g/L, which is named as solution A;
    step 2, adding concentrated sulfuric acid to the solution A in a volume of 2 mL per liter of the solution A, then water-bath heating and re-flowing for a predetermined time to obtain a solution B after cooling;
    step 3, evaporating the solution B under a vacuum pressure, dissolving remaining powder with an ethyl acetate, washing it with deionized water for predetermined times and drying, filtering and then evaporating the filtrate in a rotary evaporator until crystallization to obtain a colorless solid C, the colorless solid C is tetra(4-methylformate phenyl)silane;
    step 4, the colorless solid C and hydrazine hydrate are dissolved in methanol, with a concentration of colorless solid C is 55 g/L and a concentration of hydrazine hydrate is 35 ml/L, water-bath re-fluxing for a predetermined time, filtering and collecting white powder, and washing the white powder with methanol, drying and then obtaining a white solid D, the white solid D is tetra(4-benzoylhydrazide)silane;
    step 5, adding the white solid D and 1,4-Phthalaldehyde to N,N-dimethyl-formamide so that a concentration of the white solid D is 10 g/L and a concentration of 1,4-Phthalaldehyde is 5 g/L, after being dissolved, adding trifluoroacetic acid with an adding volume of 50 mL in per liter of the dissolved solution, and then getting a white opaque gel after 15-20 seconds and thus obtaining the desired hydrogen bond induced high stability porous covalent organic gel material.

2. The preparation method of claim 1, wherein in step 2, the water-bath heating is performed at a temperature of 85° C., and the predetermined time of in step 2 is 48 hours.

3. The preparation method of claim 1, wherein the drying process in step 3 is performed with magnesium sulfate anhydrous.

4. The preparation method of claim 1, wherein in step 4, the water-bath heating is performed at a temperature of 60° C., and the predetermined time of re-fluxing is 48 hours.

5. The preparation method of claim 1, wherein the drying process in step 4 is performed at 70° C. in a constant temperature drying oven with a blast.

6. A hydrogen bond induced high stability porous covalent organic gel material made of the preparation method according to claim 1.

7. The hydrogen bond induced high stability porous covalent organic gel material of claim 6, wherein the in step 2 of the preparation method, the water-bath heating is performed at a temperature of 85° C., and the predetermined time of re fluxing in step 2 is 48 hours.

8. The hydrogen bond induced high stability porous covalent organic gel material of claim 6, wherein the drying process in step 3 of the preparation method is performed is with magnesium sulfate anhydrous.

9. The hydrogen bond induced high stability porous covalent organic gel material of claim 6, wherein in step 4 of the preparation method, the water-bath heating is performed at a temperature of 60° C., and the predetermined time of re-fluxing is 48 hours.

10. The hydrogen bond induced high stability porous covalent organic gel material of claim 6, wherein the drying process in step 4 of the preparation method is performed at 70° C. in a constant temperature drying oven with a blast.

* * * * *